United States Patent
Jones et al.

(10) Patent No.: US 6,916,267 B2
(45) Date of Patent: Jul. 12, 2005

(54) METHOD AND APPARATUS FOR SELECTIVE ENGAGEMENT AND DISENGAGEMENT OF A RING GEAR OF A GEAR SET

(75) Inventors: Tony L. Jones, Bixby, OK (US); J. Kirk Williams, Broken Arrow, OK (US)

(73) Assignee: dp Manufacturing, Inc., Tulsa, OK (US)

( * ) Notice: Subject to any disclaimer, the term of this patent is extended or adjusted under 35 U.S.C. 154(b) by 0 days.

(21) Appl. No.: 10/403,810

(22) Filed: Mar. 31, 2003

(65) Prior Publication Data

US 2004/0192483 A1 Sep. 30, 2004

(51) Int. Cl.[7] .............................. F16H 3/44; B66D 1/22
(52) U.S. Cl. ....................... 475/299; 254/344; 254/346; 254/349
(58) Field of Search ................................. 475/298–299, 475/131, 138, 145, 146, 317; 254/339, 342, 344–346, 349; 192/83, 225, 215

(56) References Cited

U.S. PATENT DOCUMENTS

| | | | | |
|---|---|---|---|---|
| 2,564,271 A | * | 8/1951 | Millns ......................... 475/317 |
| 2,989,288 A | * | 6/1961 | Smith .......................... 475/317 |
| 3,978,996 A | * | 9/1976 | Oltrogge ...................... 414/527 |
| 4,120,486 A | * | 10/1978 | Mehnert ....................... 475/12 |
| 4,312,497 A | * | 1/1982 | Whaley ....................... 254/344 |
| 4,545,567 A | * | 10/1985 | Telford et al. .............. 188/337 |
| 4,921,219 A | * | 5/1990 | Ottemann et al. ........ 192/48.92 |
| 5,842,684 A | * | 12/1998 | Aho ............................ 254/344 |
| 6,431,103 B1 | * | 8/2002 | Meyerdierks ............... 114/218 |
| 6,604,731 B2 | * | 8/2003 | Hodge ......................... 254/344 |

* cited by examiner

*Primary Examiner*—Tisha Lewis
(74) *Attorney, Agent, or Firm*—Ladas and Parry LLP

(57) ABSTRACT

Apparatus for the selective engagement and disengagement of a ring gear of a gear set in which an actuator can be displaced between a first position engaging the ring gear and a second position disengaged from the ring gear selectively by a manually operable mechanical arrangement or a fluid pressure arrangement without altering or adding to the housing or control device of the gear set. The mechanical arrangement and the fluid pressure arrangements are integrated so that the operation of the actuator can be selectively achieved either by the mechanical or fluid arrangement.

28 Claims, 6 Drawing Sheets

METHOD AND APPARATUS FOR SELECTIVE ENGAGEMENT AND DISENGAGEMENT OF A RING GEAR OF A GEAR SET

FIELD OF THE INVENTION

The invention relates to apparatus for selective engagement and disengagement of a gear set.

More particularly, the apparatus is adapted for controlling the engagement and disengagement of a gear set selectively control the operation of a transmission for driving a winch or other gear driven device.

The invention further relates to a method for selectively engaging and disengaging the gear set and thus for enabling or disabling the transmission.

BACKGROUND OF THE INVENTION

In a conventional system for driving a winch or other gear driven device a gear set is engaged to drive the winch and a number of disengagement devices are known to disengage the gear set. In one such disengagement device, the ring gear of the gear set is released from driving the other gears and is allowed to turn freely with the rest of the gear set.

In this known device, a pin is used to secure the ring gear in place. This allows the other gears to drive against the ring gear and produce the necessary torque to drive the gear set. To disengage the gear set, the ring gear is allowed to turn freely with the rest of the gear set by pulling the pin out of engagement with the ring gear. The pin is normally activated by a handle attached to the opposite end of the pin that is engaged with the ring gear. The pin is supported for axial travel in a housing between the engagement and disengagement positions. When the handle is actuated, the pin is pulled to the disengagement position and the ring gear is set free.

Sometimes a fluid is used in place of the handle to disengage the ring gear. In this case, the housing for the handle is replaced with a different housing that allows the fluid to activate the pin, in the same manner as the handle, allowing the pin to slide axially back and forth between the engagement and disengagement positions. It is also known to attach a cylinder externally on the housing of the winch to achieve the same effect. When the fluid is supplied to the cylinder, it pulls the pin to the disengagement position, which in turn releases the ring gear to turn freely with the rest of the gears.

In both cases, when the handle or fluid is released, the pin is forced back to the engagement position by a spring acting on the pin.

SUMMARY OF THE INVENTION

An object of the invention is to provide a device which permits engagement and disengagement of a gear set selectively by a manual operation of a handle or by a pressurized fluid without altering or changing the housing or adding components to the device.

A feature of the invention is that it provides a choice of manual or fluid disengagement utilizing the same housing and a control device without the need of supplying separate parts for manual or fluid disengagement of the gear set. Hence, the same parts operate for either manual or fluid operation.

In accordance with the invention, the apparatus comprises a control device including an actuator which is supported in a housing containing the gear set. The actuator is biased by a spring to an engaged position in which the ring gear of the gear set is blocked against rotation thereby enabling the gear set to transmit drive to the driven device. The control device has a mechanical arrangement by which the actuator can be displaced to a disengaged position from the ring gear and the control device incorporates a fluid-operated arrangement by which the actuator can be disengaged from the ring gear. The mechanical and fluid arrangements are integrated in the control device such that operation of the actuator can be selectively achieved by one or the other of these arrangements using the same housing and without any addition or change of component parts.

The invention is also directed to a method by which the selective activation of the ring gear to control the gear set is achieved by mechanical or fluid operation by connecting a control device to a housing of a gear set.

The invention is also directed to the control device itself which integrates both mechanical and fluid arrangements such that the mechanical and fluid are separately operable when the control device is connected to the housing containing the gear set to selectively engage or disengage the ring gear in the gear set and thereby control transmission of drive by the gear set to the winch or similar device.

DETAILED DESCRIPTION

Figure 1:
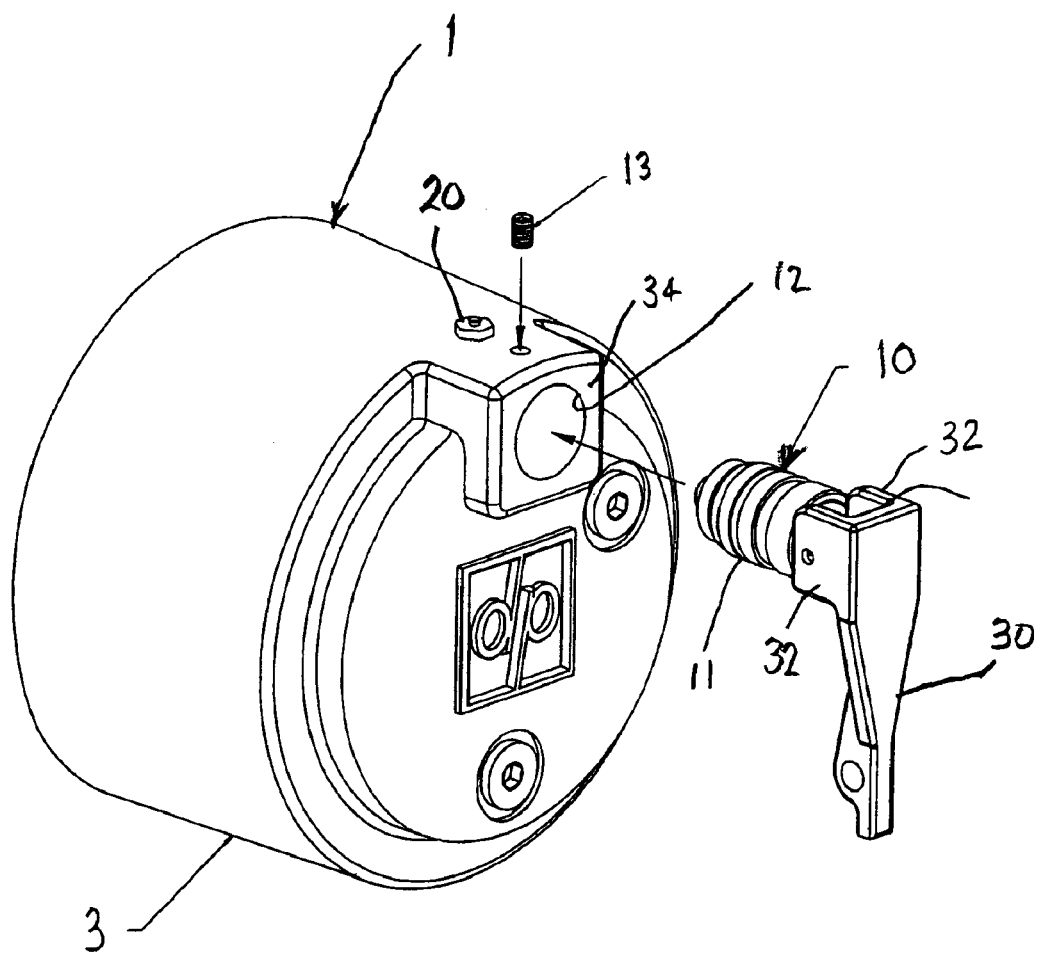
FIG. 1 is a perspective view of a control device according to the invention adapted for assembly with the main support of a winch or other gear driven device.

Referring to FIG. 1 of the drawing, therein is seen a transmission 1 adapted for delivering power from a drive source (not shown) to a driven unit (not shown) such as a winch or other gear driven device The transmission incorporates a gear set G (partially shown in FIG. 2) which includes a ring gear 2 (FIG. 2) which is rotatably supported in a housing 3 of the transmission. The ring gear 2 is connected in the rest of the gear set so that when the ring gear 2 is free to rotate, the transmission will be freewheeling and will not transmit drive from the drive source to the driven unit. However, when the ring gear is blocked from rotating, the gear set is active to transmit drive to the drive unit from the driven source.

The details of the construction of the transmission 1 are not germane to the invention and will not be described in greater detail.

In accordance with the invention, a control device 10 is provided to selectively engage and disengage the ring gear 2 in order to enable and disable the transmission 1.

A feature of the invention is that the control device 10 can be selectively operated either mechanically or by pressurized fluid. This will be explained more fully later.

The control device 10 includes a barrel or casing 11 which can be inserted into a bore 12 in the housing 3 of the transmission. The barrel is secured in the housing by a set screw 13 or other method.

Figure 2:
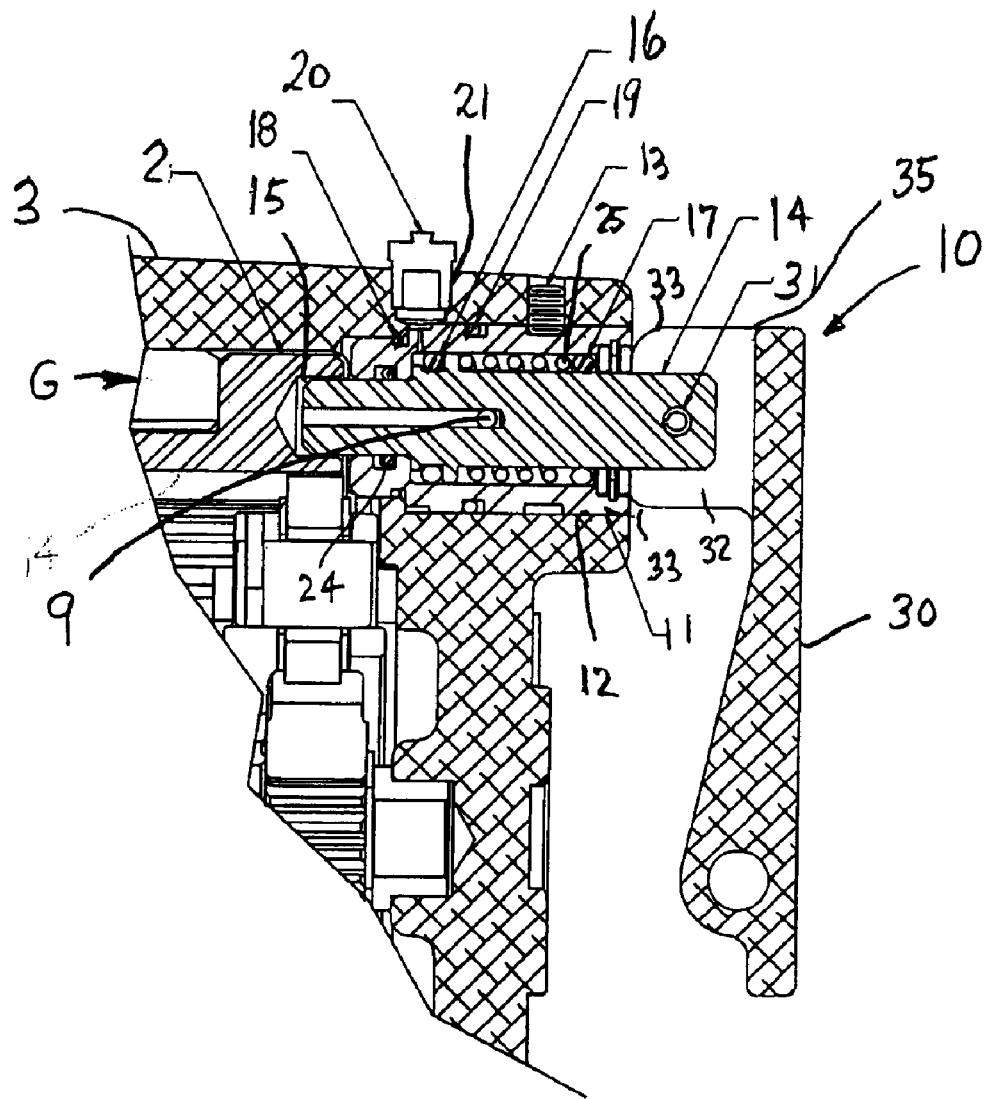
FIG. 2 is a cross-sectional view of the control device assembled with a portion of the main support of the winch or other gear driven device in an engaged state.

Referring to FIG. 2, therein it is seen that the control device 10 includes a plunger or actuator 14 adapted to engage or disengage in a hole 15 in ring gear 2 to selectively block free rotation of the ring gear. As previously indicated, the ring gear 2 enables selective drive of the transmission depending on whether the actuator 14 is engaged in hole 15 in the ring gear or disengaged from the hole 15.

A number of holes 15 are disposed circumferentially in the ring gear although only one is shown. The actuator 14 is supported in barrel 11 for axial slidable travel to engage in or disengage from the hole 15 in ring gear 2. The barrel 11 and the actuator 14 are of cylindrical shape and are preferably made of steel.

The actuator 14 has holes 9 cross-drilled therein to enable supply of a lubricant and to avoid creation of a vacuum in hole 12 in the housing. The actuator 14 is sealed in barrel 11 by o-rings 16 and 17. The barrel 11 is externally sealed in housing 3 by o-rings 18 and 19.

A removable vent 20 is inserted in a bore 21 in housing 3. The bore 21 is connected by a port 29 to an annular chamber 22 (best seen in FIG. 4) defined between o-ring 16 and o-ring 24 inside barrel 11. A coil spring 25 acts between the actuator 14 and the barrel 11 to push the actuator 14 into an engaged position in the hole 15 of the ring gear 2. FIG. 2 shows the engaged position of the actuator and the ring gear. In this position, the ring gear 2 is blocked from rotating and the transmission 1 can deliver drive to the driven unit.

Figure 3:
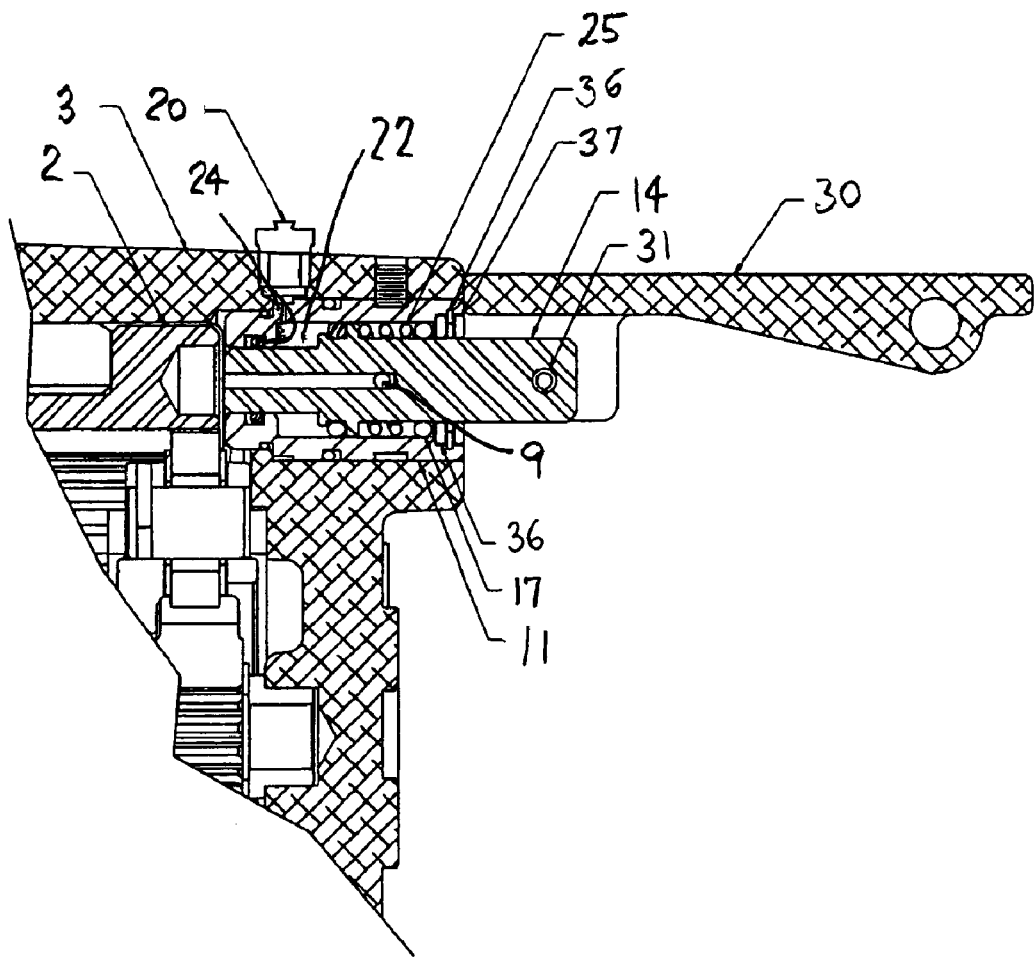
FIG. 3 is a cross-sectional view similar to FIG. 2 showing the control device in a disengaged state obtained by a manual operation.

A handle 30, in the form of a lever, is connected by a spring-biased pin 31 to an end of the actuator 14 and when the actuator is to be disengaged from the ring gear by a mechanical operation, the handle 30 is angularly moved from the position shown in FIG. 2 to the position shown in FIG. 3. This causes the actuator 14 to retract from the hole 5 in the ring gear 2 whereby the ring gear is set free for rotation with the rest of the gear set and the transmission is free-wheeling and will not transmit drive to the driven unit. The lever 30 includes a pair of wings or gussets 32 which support the ends of pin 31. The handle design is not part of the invention. The wings or gussets 32 are formed with rounded end faces 33 which ride on an end face 34 of the housing when the lever 30 is turned thereby producing axial translation of the actuator. Consequently, when the lever 30 is raised to its position of disengagement as shown in FIG. 3 the actuator will be retracted from the ring gear 2 and while compress spring 25. The actuator is thus brought to the disengaged position by a mechanical operation of raising the lever to the position shown in FIG. 3. The compressed spring 25, bears against o-ring 17 which is held in place by a spacer 36 and a retainer ring 37. When the lever is released, the spring 25 will return the actuator 14 to its engaged position with the ring gear. The handle can be of any form and attached by any means as long as it is capable of moving actuator 14 to the disengaged position.

It is again noted that in the disengagement position of FIG. 3, the actuator is removed from the engagement hole in the ring gear 2 to allow the ring gear to rotate freely with the other gears in the gear set. This enables the gear set to rotate freely inside the housing 3 without driving the winch or similar driven element.

In order to engage the actuator 14 in the hole 15 of the ring gear 2, the handle 30 is released and spring 25 displaces the actuator 14 to the position shown in FIG. 2 in which the actuator is forced into the hole 15 in the ring gear 2 thereby blocking rotation of the ring gear and activating the drive of transmission 1.

The actuator 14 can also be moved selectively by a fluid pressure arrangement instead of by the manual arrangement previously described.

Figure 4:
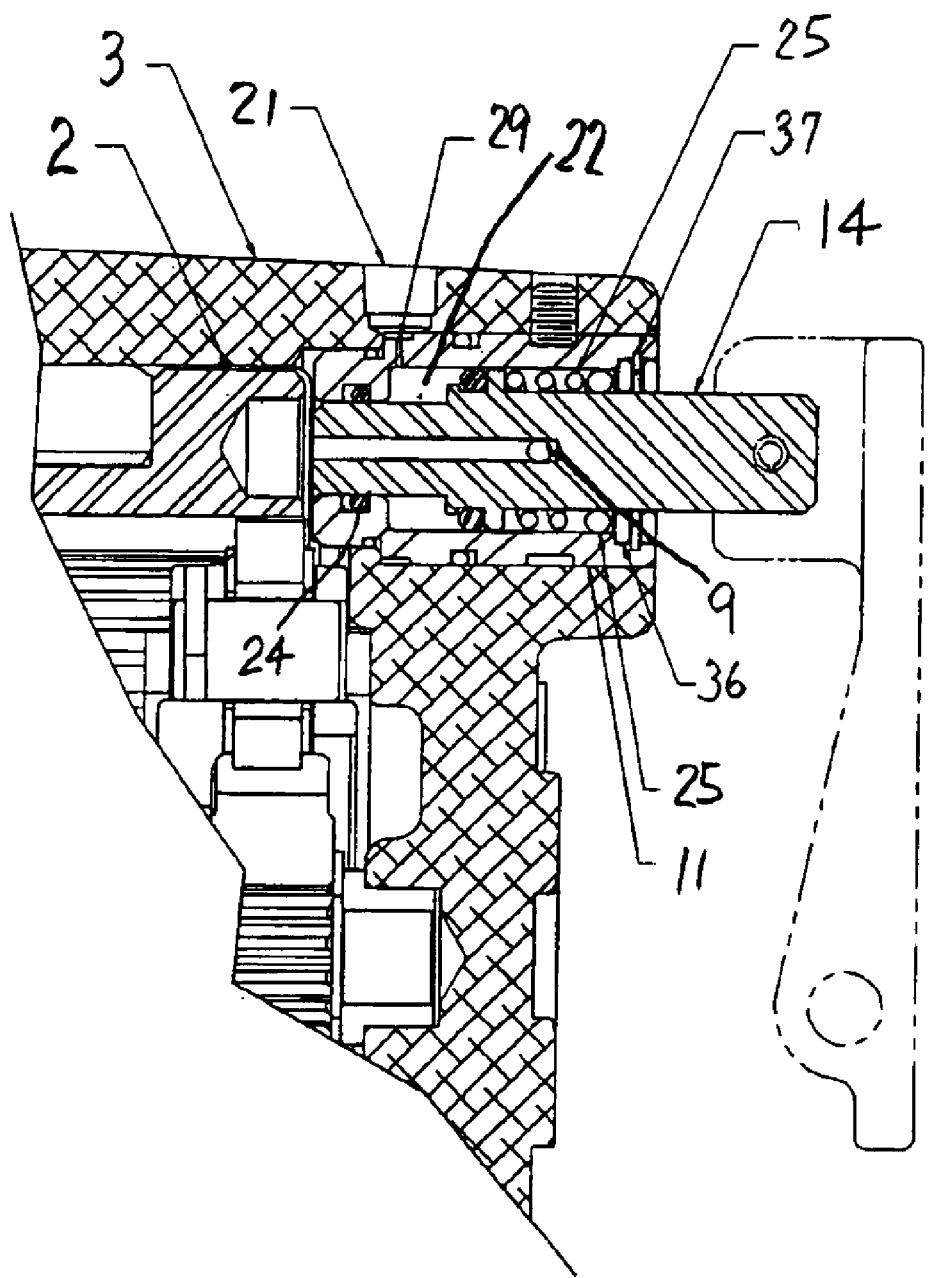
FIG. 4 is a cross-sectional view similar to FIG. 3 in which the control device is in a disengaged state obtained by a fluid operation.
Figure 5:
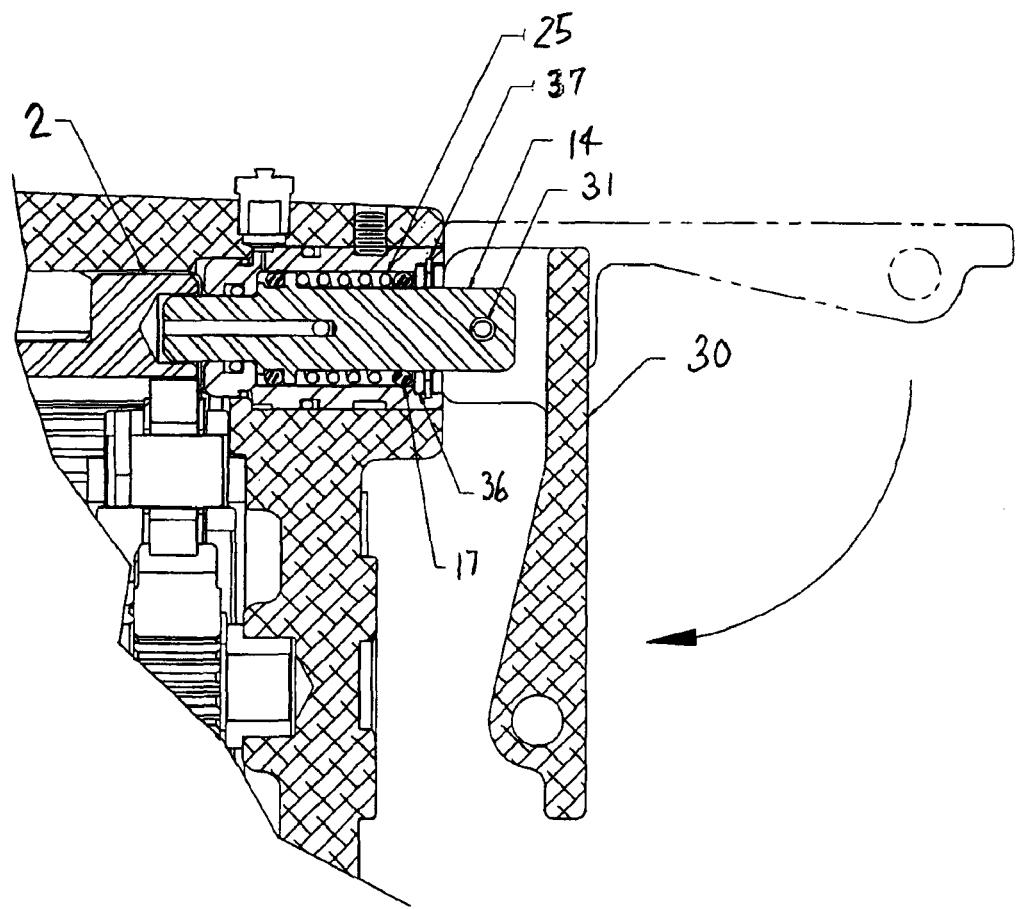
FIG. 5 is a cross-sectional view similar to FIG. 3 showing how the control device is moved to the engaged position by the manual operation.
Figure 6:
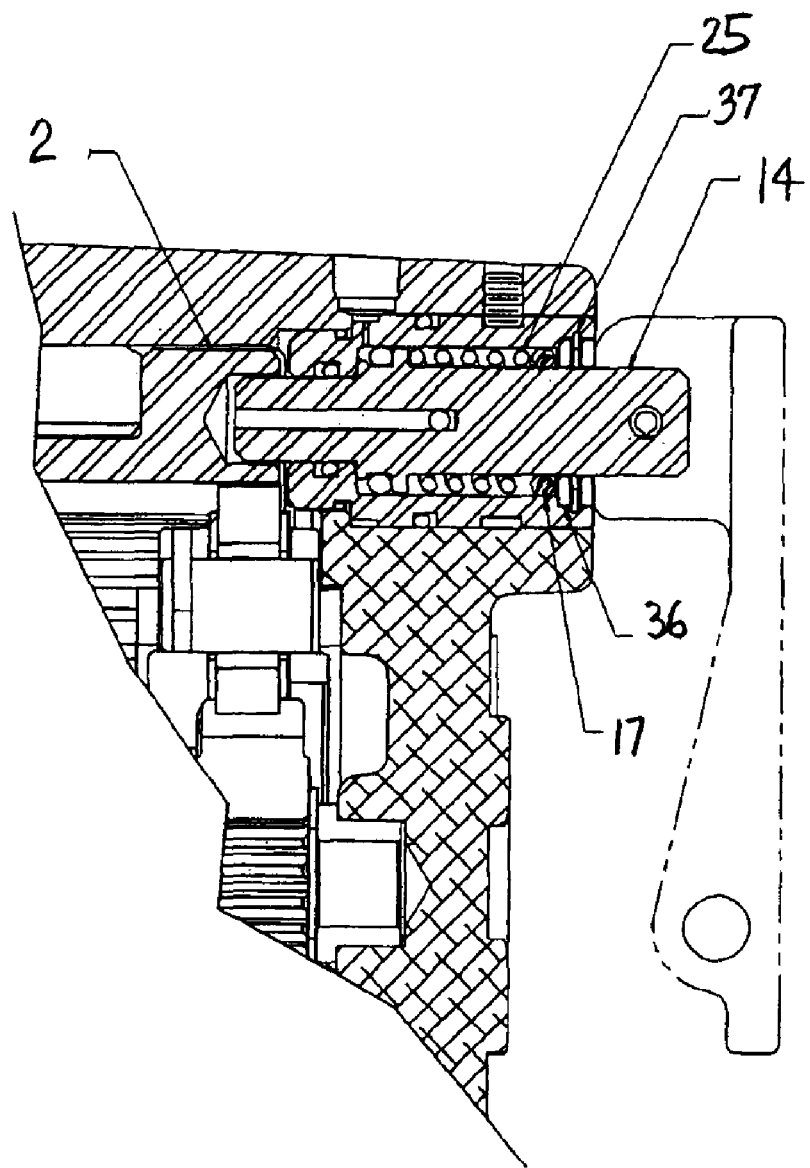
FIG. 6 is a cross-sectional view similar to FIG. 4 showing the control device in the engaged position and prepared for disengagement by the fluid operation.

In this regard and with reference to FIG. 5, the actuator 14 is in the engaged position in readiness for a fluid pressure operation by which actuator 14 will be retracted from the ring gear by a pressurized fluid. The pressurized fluid can be a liquid or a gas. In order to achieve retraction of the actuator 14, the vent 20 is removed from bore 21 and pressurized fluid is introduced through the opening 21 into the annular chamber 22 to compress spring 25 (as shown in FIG. 4) against o-ring 17 which is held in place by spacer 36 and retainer ring 37. The actuator 14 is held in the disengaged position by the constant pressure of the fluid. In the disengaged position, the actuator is pulled out of the engagement hole 15 in ring gear 2 and the ring gear is free to rotate with the other gears in the gear set so that the transmission will not transmit drive power to the winch or other gear driven device.

In order to bring the actuator into the engaged position in the hole in the ring gear, the supply of pressurized fluid to the opening 21 is halted and spring 25 will return the actuator 14 to the engaged position in hole 15 in the ring gear 2.

In accordance with the description herein, the control device 10 operates either mechanically or by fluid pressure to engage or disengage the actuator and the ring gear. This is achieved without changing the housing 11 when the device is to be used in the fluid pressure operation. All that is required is to remove the vent 20 to enable introduction of the pressurized fluid whereas when the control device 10 is used manually the vent 20 is inserted into the opening 21.

It is preferred that the winch or other gear driven device not be running when the control device 10 is being shifted between the engaged and disengaged positions.

Although the invention is disclosed with reference to a particular embodiment thereof, it will become apparent to those skilled in the art that numerous modifications and variations can be made which will fall within the scope and spirit of the invention as defined by the attached claims.

What is claimed is:

1. Apparatus for the selective engagement and disengagement of a ring gear of a gear set, said apparatus comprising:

a control device including an actuator having a first position for engaging the ring gear and a second position in which the actuator is disengaged from the ring gear, a manually operable mechanical arrangement for changing the actuator between said first and second positions, a fluid arrangement for changing the actuator between said first and second positions, said actuator being selectively movable between said first and second positions by individually and respectively operating said mechanical and fluid arrangements, and a housing supporting the gear set and said control device, said mechanical arrangement and said fluid arrangement being integrated in said control device such that operation of said actuator can be selectively and independently achieved by the mechanical or fluid arrangement without altering or adding to the housing or control device.

2. The apparatus of claim 1, comprising a spring acting on said actuator to urge the actuator to one of said first and second positions.

3. The apparatus of claim 2, wherein said mechanical and fluid arrangements are respectively coupled to said actuator within said control device to overcome the spring and displace the actuator to the other of said first and second positions.

4. The apparatus of claim 3, wherein said one of said first and second positions is the engaged position of the actuator.

5. The apparatus of claim 4, wherein the housing has an opening for admission of pressurized fluid to operate said fluid arrangement to move the actuator to the disengaged position, and a removable vent plug is provided for insertion in said opening when the actuator is to be moved by the mechanical arrangement.

6. The apparatus of claim 5, wherein said ring gear is rotatably supported in said housing and is provided with an engagement hole in which said actuator is engaged to secure the ring gear against rotation.

7. The apparatus of claim 3, wherein the mechanical arrangement includes a handle connected to the actuator to move the actuator to the disengaged position when the handle is moved.

8. The apparatus of claim 5, wherein said control device comprises a barrel adapted to be secured in said housing, said actuator being slidable in said barrel between said engaged and disengaged positions, said spring being interposed between said barrel and said actuator, said fluid arrangement comprising a chamber between said actuator and said barrel, said chamber being connected to receive pressurized fluid to overcome said spring and displace said actuator to said disengaged position independently of said mechanical arrangement.

9. The apparatus of claim 8, wherein said chamber is annular.

10. A control device adapted for selectively producing engagement and disengagement with a drive means, said control device comprising:
 a casing engageable in a housing of the drive means,
 an actuator supported in said casing for movement between a first position for producing engagement of the drive means and a second position for producing disengagement of the drive means,
 means for urging the actuator to one of said first and second positions, and
 means for driving the actuator to the other of said first and second positions and including selectively and independently operable mechanical and pressure fluid arrangements integrated with said casing of said control device for selectively and respectively driving the actuator independently of one another,
 said mechanical arrangement being coupled to said actuator to move said actuator to said other of said first and second positions thereof to overcome said means urging said actuator to said one position thereof, said pressure fluid arrangement providing a passage in said casing for pressurized fluid to apply force to said actuator to overcome said means urging said actuator to said one position thereof, whereby either said mechanical arrangement or said pressure fluid arrangement can act separately on said actuator within said casing to move said actuator to said other position thereof.

11. The control device of claim 10, wherein in said one position of the actuator, the drive means is engaged.

12. The control device of claim 11, wherein the mechanical arrangement includes a handle manually operative between a first position in which the drive means is disengaged and a second position in which the drive means is engaged.

13. The control device of claim 12, wherein said handle is connected to said actuator.

14. The control device of claim 11, wherein said means for urging said actuator to said one of said first and second positions comprises a spring.

15. The control device of claim 11, wherein the pressurized fluid arrangement includes an inlet in said casing connected to said passage for pressurized fluid to act on the actuator to disengage the drive means, said actuator producing engagement of the drive means when pressurized fluid is not supplied to said inlet.

16. A control device adapted for selectively producing engagement and disengagement with a drive means, said control device comprising:
 an actuator having a first position for producing engagement of the drive means and a second position for producing disengagement of the drive means,
 means for urging the actuator to one of said first and second positions, and
 means for driving the actuator to the other of said first and second position and including selectively and independently operable mechanical and pressure fluid arrangement integrated in said control device for selectively and respectively driving the actuator independently of one another, wherein
 said drive means is engaged in said one position, wherein said means for urging the actuator to said one of said first and second positions comprises a spring:
 said mechanical arrangement including a handle manually operative to displace the actuator to the other of said first and second positions to compress said spring,
 said pressurized fluid arrangement comprising an inlet for pressurized fluid and a chamber connected to said inlet to compress said spring by said pressurized fluid to displace the actuator to said other of said first and second positions.

17. The control device of claim 16, further comprising a barrel slidably supporting said actuator, said spring acting between said barrel and said actuator, said chamber being formed between said barrel and said actuator.

18. A method of selectively engaging and disengaging an actuator and a ring gear of a gear set for selectively driving a winch or other gear driven device, said method comprising:
 supporting the actuator in a casing secured in a housing containing the gear set and the ring gear,
 urging the actuator into engagement with the ring gear, and
 selectively disengaging the actuator from the ring gear either by a manual operation or by a fluid pressure operation without altering said housing,
 wherein the manual operation includes manually moving a handle from a position in which the actuator is engaged with the ring gear to a position in which the actuator is disengaged from the ring gear, and
 wherein the fluid pressure operation includes displacing the actuator from the engaged position with the ring gear without manually moving the handle, by introducing pressurized fluid into the casing to apply the pressurized fluid against the actuator to disengage the actuator from the ring gear.

19. The method of claim 18, wherein the ring gear is rotatably mounted in the housing and the actuator in the engaged position, is urged into a hole in the ring gear to block rotation of the ring gear, said actuator being selectively operated by said manual operation or said fluid pressure operation to remove the actuator from the hole in the ring gear.

20. The method of claim 19, comprising supporting the casing for the actuator in the housing in a releasably secured relation.

21. A winch assembly including a control device comprising selectively and independently operable mechanical and fluid pressure devices for respectively and independently deactivating the winch assembly, said control device comprising a casing selectively connected to a housing of the winch assembly, said winch assembly being activated when said casing is connected to said housing and said casing being connected to both said mechanical and fluid pressure devices for selective and independent operation by said mechanical and fluid pressure devices to deactivate the winch without altering said casing or said housing, said fluid pressure device including a fluid passage in said casing connectable to a pressurized fluid supply to deactivate the winch assembly.

22. The winch assembly of claim 21, comprising a gear set in said housing, said control device activating or deactivating the gear set to drive or free the winch assembly.

23. A winch assembly including a control device comprising a casing and selectively and independently operable mechanical and fluid pressure devices associated with said casing for respectively and independently deactivating the winch assembly said control device being connected to a housing of the winch assembly and connected to both said mechanical and fluid pressure devices for selective and independent operation by said mechanical and fluid pressure devices to deactivate the winch without altering said casing or said housing, a gear set in said housing, said control device activating or deactivating the gear set to drive or free the winch assembly, wherein the control device includes a spring which acts to normally activate the gear set, said mechanical arrangement comprising a handle which is manually movable to overcome the spring and deactivate the gear set, said fluid pressure arrangement being operable to overcome the spring by a pressurized fluid and deactivate the gear set without manually moving the handle.

24. The winch assembly of claim 23, wherein the control device includes a casing containing said spring, an actuator slidable in said casing, said actuator being acted on by said spring to activate said gear set, said handle of said mechanical arrangement being coupled to said actuator to displace said actuator against the opposition of said spring to deactivate the gear set, said fluid pressure arrangement acting between said casing and said actuator to displace the actuator under fluid pressure against opposition of the spring to deactivate the gear set.

25. A winch assembly including a control device comprising selectively operable mechanical and fluid pressure devices for deactivating the winch assembly, said control device being connected to a housing of the winch assembly for operation by said mechanical and fluid pressure devices to deactivate the winch without altering said housing, wherein the control device includes a spring which acts to normally activate the gear set, said mechanical arrangement comprising a handle which is movable to overcome the spring and deactivate the gear set, said fluid pressure arrangement being operable to overcome the spring by a pressurized fluid and deactivate the gear set, wherein said fluid pressure arrangement comprises a pressurized fluid inlet in said casing and said handle of said mechanical arrangement is connected to said actuator.

26. The winch assembly of claim 25, wherein said casing is detachably connected in a bore of said housing.

27. The apparatus of claim 8, wherein said housing has an opening and said chamber is in communication with said opening to receive pressurized fluid supplied to said opening.

28. Apparatus for the selective engagement and disengagement of a ring gear of a gear set, said apparatus comprising:

a control device including an actuator having a first position for engaging the ring gear and a second position in which the actuator is disengaged from the ring gear, a manually operable mechanical arrangement for changing the actuator between said first and second positions, a fluid arrangement for changing the actuator between said first and second positions, said actuator being selectively movable between said first and second positions by said mechanical and fluid arrangements, and a housing supporting the gear set and said control device, said mechanical arrangement and said fluid arrangement being integrated in said control device such that operation of said actuator can be selectively achieved by the mechanical or fluid arrangements without altering or adding to the housing or control device, wherein said control device comprises a barrel adapted to be secured in said housing, said actuator being slidable in said barrel between said engaged and disengaged positions, said spring being interposed between said barrel and said actuator, said fluid arrangement comprising a chamber between said actuator and said barrel, said chamber being connected to receive pressurized fluid to overcome said spring and displace said actuator to said disengaged position.

* * * * *